March 12, 1968
W. F. MANNING
3,372,409
APPARATUS FOR TRANSPORTING FLUIDS FROM A MARINE
BOTTOM TO A FLOATING VESSEL
Filed June 9, 1965
2 Sheets-Sheet 1
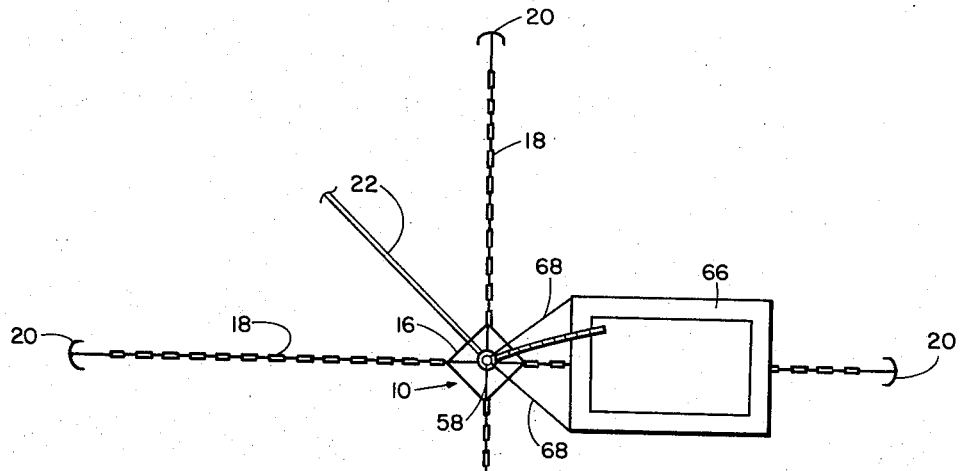
FIG I
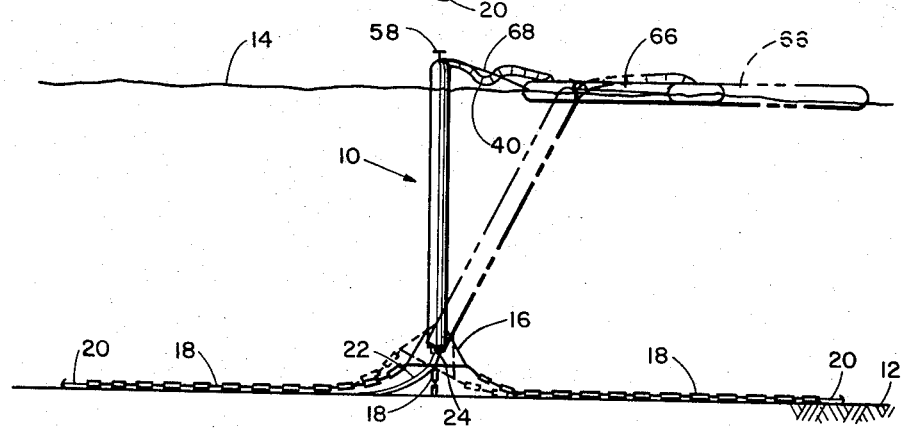
FIG II
INVENTOR
WILLIAM F. MANNING
BY Alan...

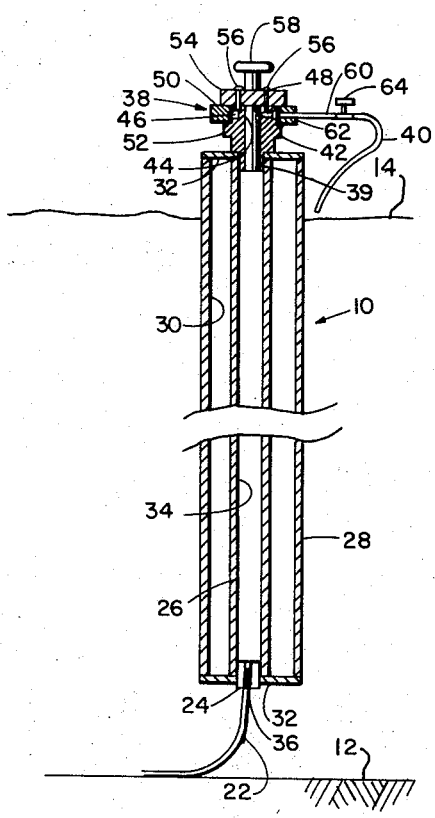
FIG III
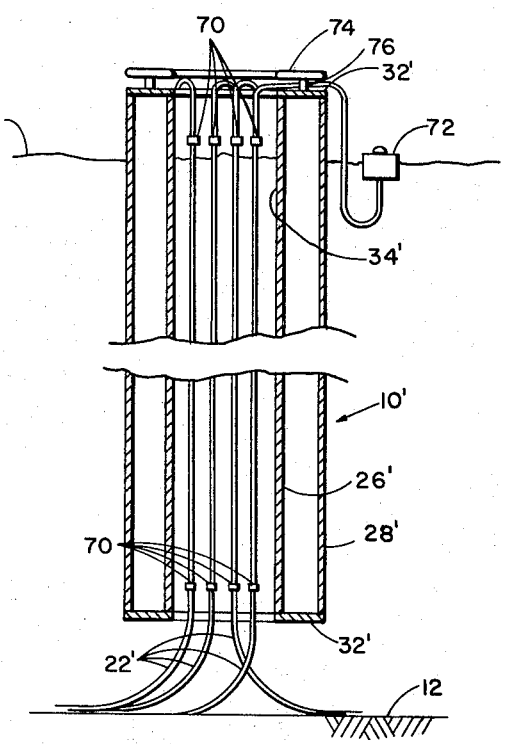
FIG IV

United States Patent Office 3,372,409
Patented Mar. 12, 1968

3,372,409
APPARATUS FOR TRANSPORTING FLUIDS FROM A MARINE BOTTOM TO A FLOATING VESSEL
William F. Manning, Springdale, Conn., assignor to Mobil Oil Corporation, a corporation of New York
Filed June 9, 1965, Ser. No. 462,431
4 Claims. (Cl. 9—8)

ABSTRACT OF THE DISCLOSURE

This specification discloses apparatus for transporting fluids from a flow line on the bottom of a body of water to a floating vessel on the surface and for mooring the vessel at the offshore location. Illustrated are several designs of buoyant, double-walled pipes, each anchored at the lower end thereof with its longitudinal axis substantially vertical. The annular space between the walls of the pipe is sealed and evacuated to provide buoyancy while a central passageway within the inner wall serves as a fluid path, either to directly conduct fluid therethrough or as a support for flow lines extending therethrough so that the fluids can be transported to the vessel moored to the upper end of the buoyant pipe.

---

The invention relates to a device for the transportation of fluids, particularly crude oil from an offshore production facility such as a submerged storage tank moored on the bottom of a body of water to a floating vessel, such as an oil barge or tanker on the surface of the body of water. More particularly the invention relates to an anchored device for reliably transporting oil from a first point on the bottom of a body of water to a barge or tanker on the surface of the body of water through a second point above the surface of the body of water, and for mooring the oil barge or tanker to said device adjacent the second point.

In coastal or offshore waters the oil produced from submerged wells is usually pressure-relieved and separated for the accompanying gas in a production facility adjacent the well site and then is either piped directly along the bottom to onshore installations or the oil is stored in, or under the surface of the water, preferably adjacent the production facility. Where the well is many miles offshore, pipelines to the shore can become prohibitively expensive, as well as impractical, and the control of the well, and the storage of the accumulated oil is better accomplished at the well site for the production of the oil to be economically feasible. One method of storing the oil at the well site is by utilizing a submerged storage tank, moored on the bottom of the body of water, near the production facilities. The production facilities, for the submerged well, may also be located on the bottom of the body of water or the oil and gas may be pumped from the submerged well to a production platform at the surface, after which the separated and pressure-relieved oil is pumped back to the submerged storage facility.

Problems have been encountered with transporting the oil directly from submerged storage facilities to oil tankers or barges on the surface and for mooring the tankers or barges adjacent the storage facilities. One of the problems encountered in transporting the oil is that the flow line from the storage facility on the bottom to the oil tanker on the surface, being at least several hundred feet long, is under considerable stress from underseas currents. Furthermore, any drifting of the barge or tanker from a position directly above the submerged storage facility changes the angle between the flow line and the bottom of the body of water, the change in geometry being reflected in a change in the required length of the flow line. Changes in the position of a barge or tanker at the surface would result in relatively larger changes in the required flow line length and a stressed or possibly ruptured line. With regard to the problem of mooring a barge or tanker at the site with its own anchors, due to the collection of servicing facilities below, this becomes exceedingly difficult without becoming entangled with the various submerged structures and mooring lines. Another problem to be considered is that of the necessity of being able to moor the tanker in any direction during loading since, for maximum stability, the tanker must be headed into the wind and/or current at all times.

Accordingly, it is an object of this invention to provide a hollow buoyant pipe, extending from a point adjacent the bottom of the body of water to the surface, for protectively encircling and supporting a flow line extending from the bottom of the body of water to the surface.

It is another object of the invention to provide a moored, hollow buoyant pipe having means for transporting oil therethrough and for mooring a ship at the upper end thereof, so that the ship may be moored to the pipe while receiving the oil therethrough without stressing or rupturing the transporting means.

All the objects and advantages of the invention will become apparent from the following description and from the accompanying drawings in which:

FIGURE 1 is a top plan view of the oil transporting and mooring device of the present invention with an oil barge moored thereto for receiving oil from a flow path extending through the device;

FIGURE 2 is a side elevational view of the oil transporting and mooring device of FIGURE 1;

FIGURE 3 is a cross-sectional view of a specific embodiment of the invention, in which a hollow buoyant pipe functions as a segment of the flow line;

FIGURE 4 is a cross-sectional view of another embodiment of the invention wherein the hollow buoyant pipe is adapted to support a number of parallel flow lines extending therethrough.

In accordance with the present invention, a hollow buoyant pipe is anchored in a body of water with the lower end of the buoyant pipe adjacent the bottom the body of water and the upper end of the pipe above the surface thereof, the pipe being fixed in a substantially vertical position. The buoyant pipe is formed with integral buoyant compartments and at least one passageway extending from the lower end of the pipe to the upper end thereof for the transportation of the oil from a submerged storage facility nearby to a floating barge or tanker. Mooring means, with 360° accessibility, is provided at the upper end of the buoyant pipe, above the surface of the water.

In the preferred embodiment of the invention, the pipe is formed by a closed, double-wall construction, consisting of a pair of nesting tubes or walls, the ends of the annulus between the inner and outer tubes or walls being closed off and the annulus being evacuated of water to provide buoyancy for the pipe. The hollow interior of the inner tube or wall acts as an integral oil flow passageway. A flow line, lying on bottom of the body of water, and having its far end connected to a submerged oil outlet, has its near end in engagement with the lower end of the buoyant pipe by means of a watertight connection. A second watertight connection is used at the upper end of the buoyant pipe to operatively connect a loading line to the pipe so that oil may flow from the oil outlet through the flow line, up through the buoyant pipe, out the loading line, and into the barge or tanker moored to the buoyant pipe. When it is desirable to have more than one flow line extending through the buoyant tank the inner wall of the inner tube, forming the passageway, is left open at both ends and provided with means for holding a number of flow lines in a vertical parallel relationship along the wall. In this case the buoyant pipe is usually of larger diameter than that necessary in the first described structure to permit a number of flow lines of reasonably large capacity to be held within the passageway.

Referring now to the drawings, in particular FIGURES 1 and 2, a buoyant pipe, generally designated 10, is shown floating vertically in a body of water, extending from a point near the bottom 12 of the body of water to a point above the surface 14. A square spread frame 16, attached to the pipe 10, near the bottom thereof has four anchor chains 18 connecting the four corners of the spread frame 16, each to a Danforth anchor 20 embedded in the bottom 12. A flow line 22 lying on the bottom 12, extends from a submerged storage facility (not shown) to the buoyant pipe 10 through the bottom of which it is connected by means of a plug 24 sealed thereto.

Now turning attention to FIGURE 3, the buoyant pipe 10 is formed by a pair of concentric nesting hollow tubes or cylindrical walls, an inner tube or wall 26, and an outer tube or wall 28. The tubes or walls 26 and 28 are spaced apart to form an annular area which is completed as a water tight compartment 30 by a pair of end plates 32 welded across the upper and lower ends of the tubes 26 and 28. Each end plate 32 has a central hole coincident with the hollow center of the inner tube 26, forming a passageway 34 extending axially through the buoyant pipe 10. If structural requirements make it necessary, a number of annular plates (not shown) may also be spaced along the length of the buoyant pipe 10 within the outer tube 28 and over the inner tube 26. The annular compartment 30, that is illustrated here as being formed by the inner and outer tubes 26, 28, respectively, and the end plates 32, may be fabricated by numerous methods, as desired, the particular method of forming the annular compartment 30 not forming a part of the invention.

The plug 24 fixedly sealed in the lower end of the buoyant pipe 10, extends into the passageway 34 and has a port 36 connecting the flow line 22 with the passageway 34 whereby oil may flow from the flow line 22 directly through the buoyant pipe 10 to the surface 14 of the body of water. A fitting, generally designated 38, is sealed to the upper end of the buoyant pipe 10 and extends into the passageway 34 to operatively connect the passageway 34 with a loading hose 40.

The fitting 38 consists in part of a cylidnrical body 42 with a necked-down lower end portion 39 depending into the upper end of the passageway 34. A concentric axial port 44 extends vertically through the fitting body 42, opening into the passageway 34 in the pipe 10. An annular groove 46 surrounds the upper end of the fitting body 42 and is interconnected with the upper end of the axial port 44 by means of at least one radial passage 48. A rotatable ring 50 snugly encircles the groove 46, being axially located between an integral annular flange 52 on the fitting body 42 and the lower face of a fitting head 54, which is fixed to the top of the fitting body 42 by bolts 56. A mooring cleat 58 is mounted on the top of the head 54 and extends above all other elements of the buoyant pipe 10. Seals, packing, and/or bearings may be incorporated between the ring 50 and the fitting 38 as found necessary to permit the ring 50 to rotate while retaining a fluid-tight seal. A hollow tubular element 60, fastened at one end to an end of the loading hose 40, is rigidly connected at its other end to the ring 50, over a radially drilled hole 62 extending therethrough, so that the oil driven up through the passageway 34 flows out through the axial port 44, radial passage 48, groove 46, drilled hole 62, tubular element 60, and loading hose 40, regardless of the angular position of the ring 50 and the associated tubular element 60 with respect to the fitting 38. A valve 64 may be inserted in the tubular element 60 to control the flow of oil.

Looking back to FIGURE 2, an oil barge 66 is moored by a line 68, connecting it to the mooring cleat 58 on the top of the buoyant pipe 10, while the loading hose 40, fastened to the buoyant pipe 10, is fixed on the oil barge 66 to permit oil to flow into the barge's storage tanks (not shown). It can be seen, in phantom, that drifting of the barge will impose no strain on the loading hose 40 or the flow line 22 but instead will at all times exert any forces through the mooring line 68, the rigid buoyant pipe 10, the spread frame 16, and the anchor lines 18, to the anchors 20. Regardless of the drifting of the barge 66 there is no possibility of it causing tangled lines since the only connection between the barge 66, on the surface 14 of the body of water, and the bottom 12 of the body of water, is the buoyant pipe 10.

A buoyant pipe 10', as shown in FIGURE 4, designed to accommodate a number of flow lines 22', is constructed of a pair of nesting tubes 26' and 28', and a pair of end plates 32' similar to those disclosed in the discussion of the device illustrated in FIGURE 3. In this embodiment a central passageway 34', within the inner tube 26', is open at both ends. A number of flow lines 22' extend up all the way through the buoyant pipe 10' and may also act as loading hoses. Each of the flow lines 22' is threaded through several levels of supporting guide loops 70 spaced around the inside of the passageway 34' so that the flow lines are each supported vertically, parallel to each other. Further, a buoy 72 may be connected to the upper end of each of the flow lines 22' to insure that the lines 22' stay above the surface 14 of the water when not in use. A ring-shaped mooring cleat 74 is mounted above the upper end of the buoyant pipe 10' by spaced integral legs 76, welded or otherwise rigidly fixed to the upper plate 32' so as to moor an oil barge through the buoyant pipe 10' while oil is being transported therethrough as shown in FIGURE 2.

The buoyant pipes 10 and 10' are designed to be constructed ashore and then brought to the site of a submerged facility at which a flow line is required to be extended to the surface. The pipes 10, 10' are ballasted into the vertical position, from the horizontal attitude in which they are easily towed to the site. This may be done by placing a weight in one end of the annular compartment 30 or by longitudinally segmenting the annular compartment 30 and filling only the lower section with water.

Although the present invention has been described in connection with details of specific embodiments thereof, it is to be understood that such details are not intended to limit the scope of the invention. The terms and expressions employed are used in a descriptive and not a limiting sense and there is no intention of excluding such equivalents, in the invention described, as fall within the scope of the claims. Now having described the apparatus herein disclosed, reference should be had to the claims which follow.

What is claimed is:

1. A device for transporting fluid from a first point on the bottom of a body of deep water to a second point above the surface of said body of water and for mooring a ship adjacent said second point, comprising; a rigid buoyant pipe extending from said first point on said bottom of said body of water to said second point above said surface of said body of water, said rigid buoyant pipe comprising concentric inner and outer cylindrical walls, said inner wall defining a central passageway therewithin extending the length of said buoyant pipe, said passageway being adapted to transport said fluid from said first point to said second point, said inner and outer walls co-operating to define an annular compartment therebetween extending the length of said buoyant pipe, means for sealing said annular compartment formed between said inner and said outer cylindrical walls at the upper and lower ends of said rigid buoyant pipe whereby said annular compartment is watertight to provide the buoyancy of said rigid buoyant pipe; flexible means connected to the lower end of said rigid buoyant pipe for anchoring said rigid buoyant pipe in said bottom with its longitudinal dimension being substantially vertical, a mooring means fixed directly over the upper end of said buoyant pipe for mooring a ship to said buoyant pipe from any direction, a flexible means connecting a ship to said mooring means, and means including a flexible loading line for transporting fluid from said second point to a ship moored to said buoyant pipe.

2. In the device of claim 1, means for operatively connecting one end of a fluid-carrying flexible flow line to said passageway at the lower end of said buoyant pipe adjacent said bottom, said flow line lying on said bottom of said body of water for the greater portion of its length.

3. In the device of claim 2, means for connecting an end of said flexible loading line to said upper end of said rigid buoyant pipe above said surface of said body of water for unrestricted rotation of said end of said flexible loading line around said buoyant pipe at the point of connection while permitting a continuous flow of fluid from said rigid buoyant pipe through said flexible loading line.

4. In the device of claim 1, means for supporting parallel flexible flow lines, extending through said rigid buoyant pipe, within said passageway and, further extending along the bottom of said body of water from offshore fluid outlets, can be connected to a fluid transporting ship on the surface without the strains incident to said flow lines extending unsupported along the distance through the water from said bottom to said surface thereof, and whereby the distance that the fluid is required to travel between said lower end of said rigid buoyant pipe and said ship remains substantially constant.

References Cited

UNITED STATES PATENTS

| 2,701,375 | 2/1955 | Ault | 9—8 |
| 2,955,626 | 10/1960 | Hartley | 137—236 X |
| 3,190,495 | 6/1965 | Mandel | 9—8 |
| 3,261,039 | 7/1966 | Koppenol | 9—8 |

WILLIAM F. O'DEA, *Primary Examiner.*

HAROLD W. WEAKLEY, *Examiner.*